United States Patent [19]
Hohmuth

[11] Patent Number: 6,078,162
[45] Date of Patent: Jun. 20, 2000

[54] METHOD FOR OPERATING PARALLEL DC-LINKED AC CONVERTERS FOR FEEDING AN ASYNCHRONOUS MOTOR AND CIRCUITRY FOR CARRYING OUT THE METHOD

[75] Inventor: Günter Hohmuth, Berlin, Germany

[73] Assignee: Alcatel, Paris, France

[21] Appl. No.: 09/100,432

[22] Filed: Jun. 19, 1998

[30] Foreign Application Priority Data

Jun. 20, 1997 [DE] Germany .......................... 197 26 161

[51] Int. Cl.[7] ..................................................... H02P 7/36
[52] U.S. Cl. ........................................... 318/800; 318/801
[58] Field of Search .................................... 318/805, 800,
318/798, 803, 814; 363/136, 40

[56] References Cited

U.S. PATENT DOCUMENTS

| | | |
|---|---|---|
| 4,553,197 | 11/1985 | Stemmler . |
| 4,600,874 | 7/1986 | Tupper et al. ........................... 318/798 |
| 4,602,198 | 7/1986 | Weiss et al. ............................ 318/798 |
| 4,602,199 | 7/1986 | Walker .................................... 318/798 |
| 4,607,206 | 8/1986 | Sember et al. ........................... 318/798 |
| 4,677,360 | 6/1987 | Garces .................................... 318/803 |
| 4,736,148 | 4/1988 | Hirata . |
| 4,942,511 | 7/1990 | Lipo et al. ............................... 363/136 |
| 5,384,696 | 1/1995 | Moran et al. ............................ 363/40 |

FOREIGN PATENT DOCUMENTS

| | | |
|---|---|---|
| 0511344 | 11/1992 | European Pat. Off. ......... H02M 7/48 |
| 0600312 | 6/1994 | European Pat. Off. ......... H02M 7/48 |
| 3725515 | 2/1989 | Germany . |
| 2201948 | 7/1992 | Germany . |
| 0542507 | 5/1993 | Germany . |

OTHER PUBLICATIONS

"Energieeninsparung durch drehzahveranderbare ekektrische Antriebe", in *Etz*, vol. 101 (1980), No. 5, pp. 282–284.

"A Modified Control Method for Fast–Response Current Source Inverter Drives", D. Deng et al, IEEE Transactions on Industry Applications, vol. IA–22, No. 4, Jul./Aug. 1986, pp. 653–665.

"Power Conditioning Systems for Superconductive Magnetic Energy Storage", by R.H. Lasseter et al, 8047d IEEE Transactions on Energy Conversion, No. 3, Sep. 1991, New York, pp. 381–387.

Patent Abstracts of Japan, vol. 010, No. 302 (E–445) Oct. 15, 1986 & JP 61 116996 A (Toshiba Corp.), Jun. 4, 1986.

*Primary Examiner*—Robert E. Nappi
*Assistant Examiner*—Rita Leyrin

[57] ABSTRACT

A first DC-linked AC converter with a machine converter (6) with controllable turn-on thyristors is connected in parallel with a second DC-linked AC converter with a machine converter (4) equipped with so-called gate-turn-off (GTO) thyristors which can be turned off. The second DC-linked AC converter with a machine converter equipped with controllable turn-on and turn-off thyristors is particularly adapted to feed a drive for pumps and fans where an exceedingly small torque and a small output power is required at low rotation speeds. The second DC-linked AC converter equipped with GTO thyristors is controlled so as to supply predominantly the reactive power for the asynchronous machine (5) and the commutation reactive power for the normal thyristor converter (6) minus the reactive power of the capacitors ($C_R$).

4 Claims, 6 Drawing Sheets

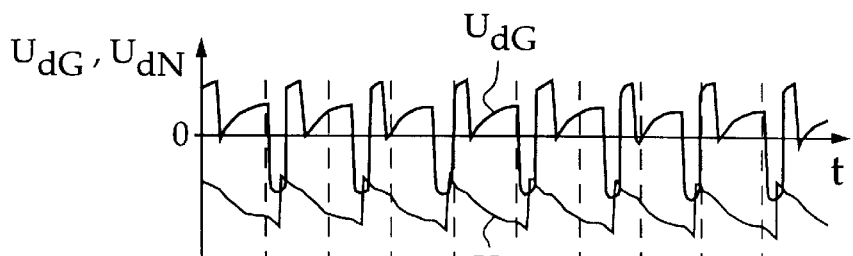
FIG. 6(a)
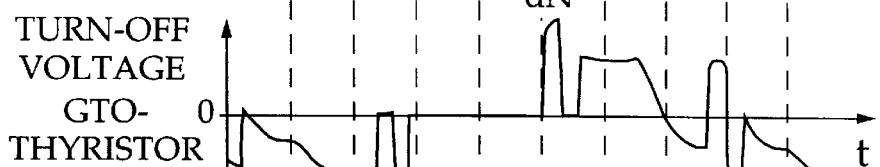
FIG. 6(b)
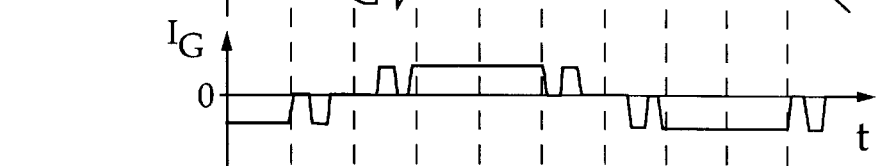
FIG. 6(c)
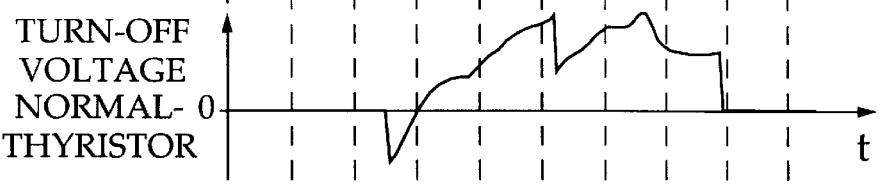
FIG. 6(d)
FIG. 6(e)
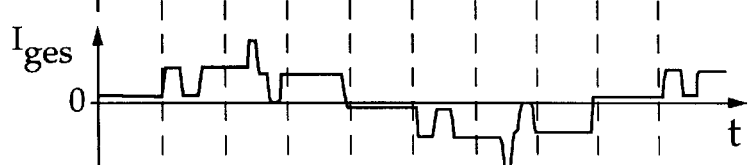
FIG. 6(f)
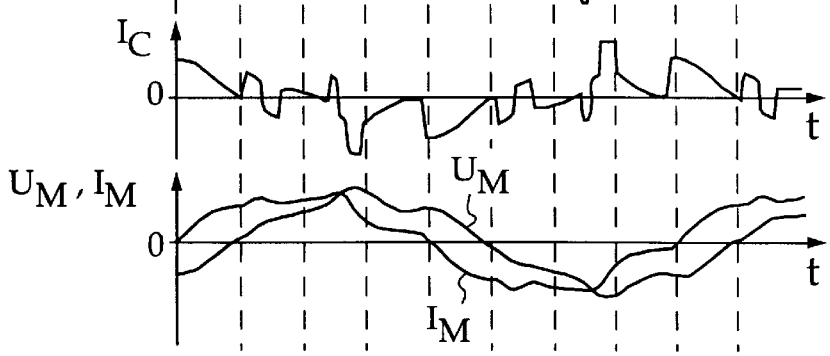
FIG. 6(g)
FIG. 6(h)

6,078,162

METHOD FOR OPERATING PARALLEL DC-LINKED AC CONVERTERS FOR FEEDING AN ASYNCHRONOUS MOTOR AND CIRCUITRY FOR CARRYING OUT THE METHOD

BACKGROUND OF THE INVENTION

1. Technical Field

The invention relates to operating DC-linked AC converters connected in parallel for feeding an asynchronous machine and, more particularly, for driving equipment using the principle of field-oriented control.

2. Discussion of Related Art

It is commonly known to use DC-linked AC converters for feeding electrical machines at variable frequency with varying current and voltage. A DC-linked AC converter comprises a line converter, an intermediate current circuit with a DC smoothing choke and a machine converter. The converters are preferably arranged in a three-phase bridge circuit. The DC link current is adjusted and held constant with a suitable controller via the line converter. The DC link current is converted to AC with the desired frequency and distributed to the phases of the machine through the machine converter.

If the power of a DC-linked AC converter is not sufficient to supply a machine, then it is known to connect DC-linked AC converters of identical design in parallel, see for example EP 511 344 B1, EP 600 312 B1. With the solutions described therein, an almost sinusoidal motor current can be maintained in drives with a high rotation speed and high output power even at operating frequencies above 500 Hz; however, these solutions cannot be easily applied to drives which have to operate over a wide range of rotation speeds and with different torque requirements.

SUMMARY OF INVENTION

It is the object of the invention to provide a DC-linked AC converter arrangement for feeding an asynchronous motor, in particular a motor for driving pumps and fans.

According to a first aspect of the invention, an apparatus for operating DC-linked AC converters connected in parallel for feeding an asynchronous machine by using the principle of field-oriented control, is characterized in that a first DC-linked AC converter including a machine converter comprising controlled turn-on (i.e., controlled non-resettable turnoff) devices and a second DC-linked AC converter including a machine converter comprising controlled turn-on and turnoff (i.e., controlled resettable turnoff) devices are connected in parallel to the asynchronous machine, that the DC-linked AC converter including the machine converter comprising controlled turn-on turnoff devices is controllable so as to supply reactive power for the asynchronous machine and commutation reactive power for the DC-linked AC converter including the machine converter comprising controlled turn-on devices minus reactive power of commutation capacitors connected to the asynchronous machine.

According to a second aspect of the invention, a circuitry with a first DC-linked AC converter in parallel with a second DC-linked AC converter, each DC-linked AC converter comprising a line converter, a current link with a DC smoothing choke and a machine converter is characterized in that AC outputs of a first machine converter of said first DC-linked AC converter having controlled turn-on devices are connected to AC outputs of a second machine converter of said second DC-linked AC converter having controlled turn-on and turnoff devices as well as to the terminals of an asynchronous machine.

According to the basic concept of the invention, the DC-linked AC converter is formed by connecting in parallel a first DC-linked AC converter and a second DC-linked AC converter, wherein the machine converter of the first DC-linked AC converter is equipped with controlled turn-on, i.e., non-resettable thyristors with turnoff performed by commutation in the conventional manner, in the following referred to in short as "normal" thyristor converter, and wherein the machine converter of the second DC-linked AC converter is equipped with controlled turn-on and turnoff (i.e., resettable) devices, such as gate-turn-off thyristors, in the following referred to in short as a GTO thyristor converter. With the parallel connection of a normal thyristor machine converter and a GTO thyristor machine converter, the normal thyristor converter advantageously operates as an inductive source, whereas the GTO thyristor converter can operate both as an inductive and as a capacitive source.

The normal thyristor machine converter is operated with the smallest possible AC converter phase angle, i.e., with the phase angle which ensures a hold-off interval for the previously conducting thyristor which is long enough to prevent a re-ignition when a positive voltage is applied. The GTO thyristor machine converter is controlled so as to supply essentially the reactive power for the machine as well as the commutation reactive power for the normal thyristor converter minus the reactive power of the capacitors.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 6 shows a diagram of the currents and voltage as a function of time for the circuitry of FIG. 3, including:

(a) a pair of waveforms showing the voltage inputs to the machine converters of the DC-linked AC converters connected in parallel, (b) a turn-off voltage provided at a GTO-thyristor, (c) an output current waveform of the GTO-thyristor converter, (d) a turn-off voltage at the normal thyristor converter, (e) a normal thyristor converter output current waveform, (f) a combined output current of both the normal thyristor converter and the GTO-thyristor converter, (g) a capacitive current waveform of the capacitor connected to the DC link, and (h) a pair of waveforms illustrating the asynchronous motor voltage and current.

(a) a zero voltage at the input of the GTO thyristor converter, (b) a voltage at the input of the normal thyristor converter, (c) a GTO-thyristor-voltage, (d) a zero output current from the GTO thyristor converter, (e) a normal thyristor-voltage waveform, (f) the output current waveform of the normal thyristor converter, and (g) a pair of waveforms showing the total current from the two converters in parallel, in this case the same as the output of the normal thyristor converter, and the voltage of the asynchronous machine.

(a) a waveform showing the voltage input to the GTO thyristor converter, (b) a waveform showing the input to the normal thyristor converter, (c) a waveform showing the GTO-thyristor-voltage, (d) a waveform showing the output current of the GTO thyristor converter, (e) a waveform showing the normal thyristor-voltage, (f) a waveform showing the output current of the normal thyristor converter, and (g) a pair of waveforms showing the combined output currents of the GTO thyristor converter and the normal thyristor converter as well as the voltage of the motor.

DETAILED DESCRIPTION OF PREFERRED EMBODIMENTS

Figure 1:
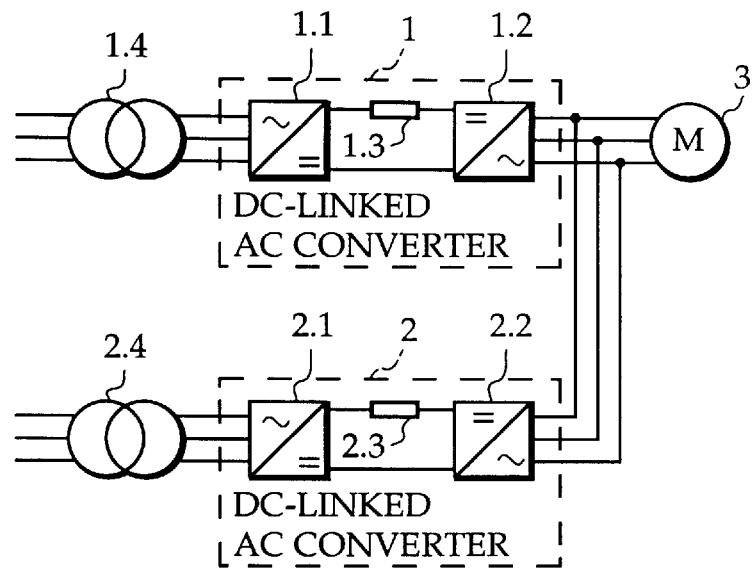
FIG. 1 shows circuitry according to the state-of-the-art for connecting two DC-linked AC converters in parallel.

Referring now to FIG. 1, the parallel connection of two DC-linked AC converters consists of a first DC-linked AC converter 1 and a second DC-linked AC converter 2, each of which includes a line converter 1.1, 2.1, a machine converter 1.2, 2.2 and a DC smoothing choke 1.3, 2.3 connected to a DC current link connecting the line and machine converters. The first and the second DC-linked AC converter 1, 2 are supplied via a first transformer 1.4 and a second transformer 2.4, respectively. On the machine side, the two DC-linked AC converters 1, 2 are connected in parallel and thereby feed the machine 3.

Figure 2:
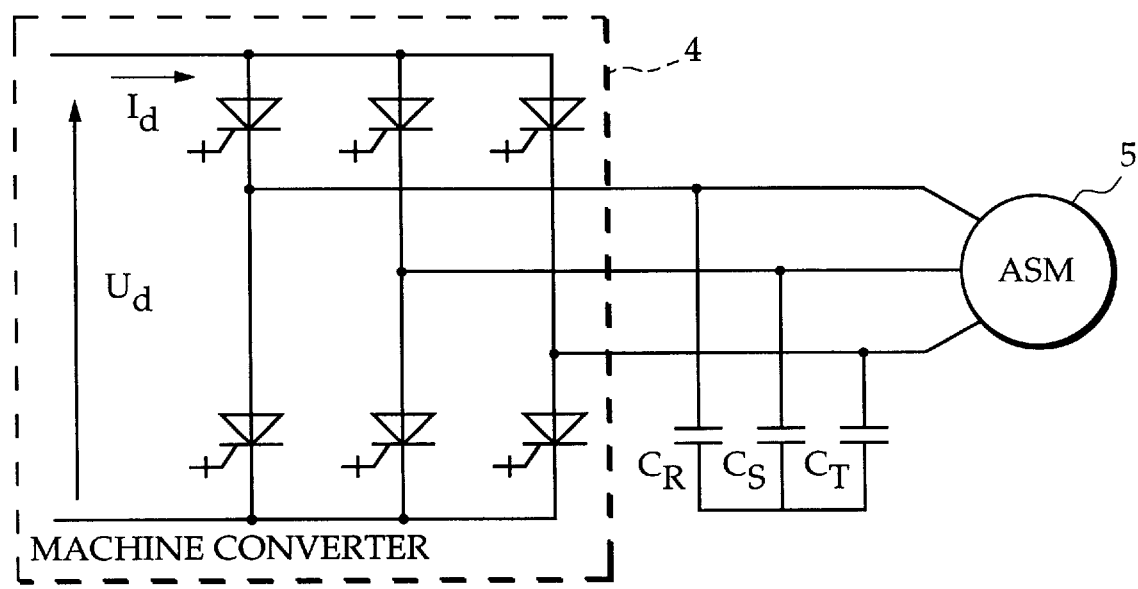
FIG. 2 shows circuitry for feeding an asynchronous machine with a GTO thyristor machine converter.

When operating a synchronous machine, normal thyristors can be employed in the line converter and in the machine converter, with the commutation performed in the conventional manner. For supplying an asynchronous machine 5 according to FIG. 2, commutation in the machine converter 4 has to be forced by a capacitor discharge. Alternatively, thyristors which can be turned off, so-called GTO thyristors, can be used in the machine converter 4, as illustrated to FIG. 2. In order for the GTO thyristors to be able to switch in a DC-linked AC converter, capacitors $C_R$, $C_S$, $C_T$ have to be connected to the AC voltage terminals of the machine converter 4. The capacitors $C_R$, $C_S$, $C_T$ in conjunction with the stray inductances of the asynchronous machine 5 form oscillating circuits and therefore have to be dimensioned such that the resulting resonant frequency is spaced far enough apart from the frequency of the fundamental oscillation and the pulse frequencies of the machine converter 4.

Because high-performance GTO thyristors can only be operated at relatively low switching frequencies, the frequencies of the harmonics are also low. The resonant frequency defined by the capacitors $C_R$, $C_S$ and $C_T$ and the stray inductances of the asynchronous machine 5 must be set below the smallest harmonic frequency by dimensioning the capacitors $C_R$, $C_S$ and $C_T$ accordingly. At the highest machine voltage $U_M$ and the largest frequency, a current which is in the order of the machine current $I_M$, flows at the fundamental frequency via the capacitors $C_R$, $C_S$ and $C_T$ which are dimensioned according the above requirements. The capacitor current $I_C$ counteracts the reactance current of the machine and is capable of compensating the reactance current to a degree where the total current $I_{ges}$ becomes capacitive, as illustrated in FIG. 5.

Applications at low rotation speeds where the machine is used to drive pumps or fans, require only a very small torque and a correspondingly small power which can be supplied by a converter with a low performance rating.

Figure 3:
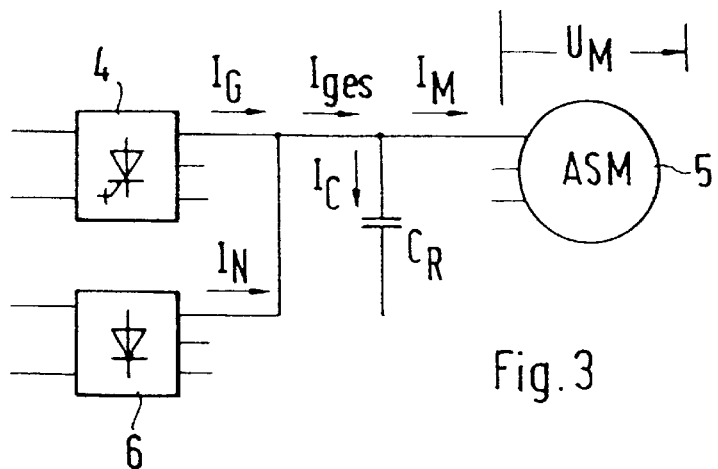
FIG. 3 shows circuitry for implementing the method of the invention.

FIG. 3 illustrates a normal thyristor machine converter 6 and a GTO thyristor machine converter 4 connected in parallel on the AC side and together feeding an asynchronous machine 5. For the sake of clarity, the line converters are not shown and only one phase of the three-phase system is shown at the outputs of the machine converters 4, 6. The total current $I_{ges}$ of the DC-linked AC converters in parallel (as in FIG. 1) is comprised of the current $I_G$ of the GTO thyristor machine converter 4 and the current $I_N$ of the normal thyristor machine converter 6. The total current $I_{ges}$ branches to the machine current $I_M$ and the capacitive current $I_C$ for the capacitor $C_R$. The machine current $I_M$ generates the machine voltage $U_M$ at the asynchronous machine 5.

Figure 4:
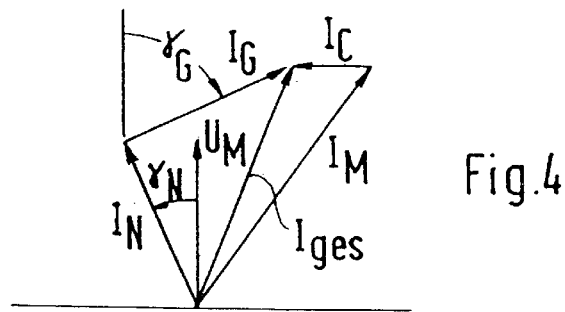
FIG. 4 shows a vector diagram for the circuitry of FIG. 3 when operating an asynchronous machine in a low rotation speed range.
Figure 5:
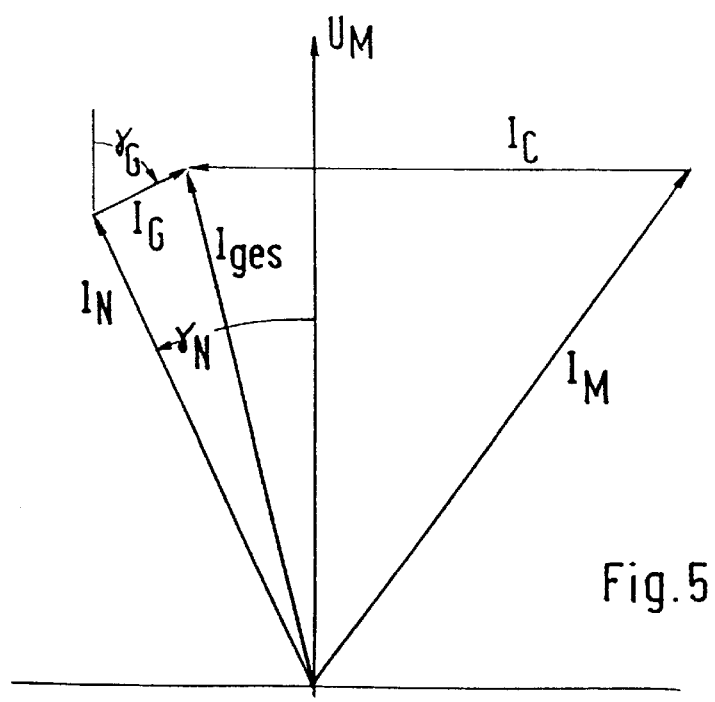
FIG. 5 shows a vector diagram for the circuitry of FIG. 3 when operating an asynchronous machine in a high rotation speed range.

In FIGS. 4 and 5, there are depicted vector diagrams of the currents in relation to the machine voltage $U_M$ for different operational states of the circuitry of FIG. 3. The reference designations are identical to those of FIG. 3; the inverter phase angle of the GTO thyristor machine converter 4 is designated as $\gamma_G$ and the inverter phase angle of the normal thyristor machine converter 6 is designated as $\gamma_N$. In the two operational states illustrated in FIGS. 4 and 5, the normal thyristor machine converter 6 operates in inverter end position, as indicated by the current vector $I_N$ and the inverter phase angle $\gamma_N$. In both operational states, the GTO thyristor machine converter 4 is controlled so as to function as a capacitive source, as indicated by the current vector $I_G$. The operational states depicted in FIG. 4 and FIG. 5 are typical for driving pumps and fans.

FIG. 4 shows the performance in a low rotation speed range at a correspondingly low frequency and a small torque and a correspondingly small machine voltage $U_M$. In this operational state, the capacitive current $I_C$ is very small due to the low frequency, so that the total converter current $I_{ges}$ becomes inductive, so that it is not possible to use only the normal thyristor machine converter.

FIG. 5 shows a vector diagram for a high frequency, a large torque and a large machine voltage $U_M$. Although the total converter current $I_{ges}$ is capacitive, $I_{ges}$ exceeds the breakover limit of a normal thyristor machine converter. Consequently, an additional current component $I_G$ from the GTO thyristor machine converter 4 has to be supplied as well.

Figure 7:
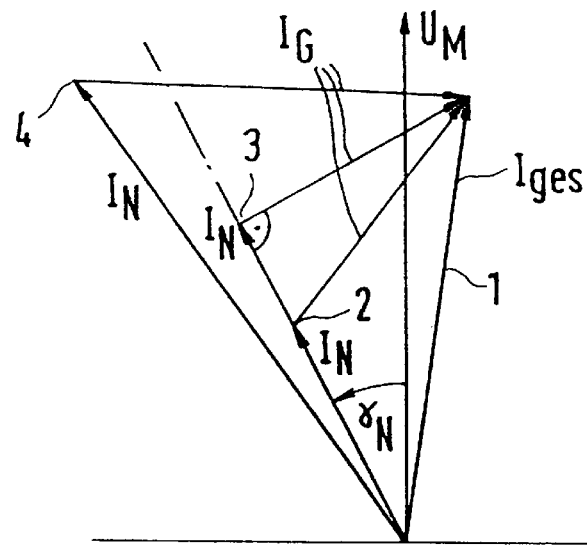
FIG. 7 shows a vector diagram for the circuitry of FIG. 3 for different operational states of the machine converter.

FIG. 7 illustrates several possibilities for allocating the total current of the converter $I_{ges}$ to the normal thyristor machine converter 6 and the GTO thyristor machine converter 4 according to the following formula:

$$I_{ges} = I_N + I_G$$
$$= I_M + I_C.$$

The following examples are illustrated in FIG. 7:
1. $I_G = I_{ges}$ $I_N = 0$

The normal thyristor machine converter 6 is inhibited, the GTO thyristor machine converter 4 supplies the total converter current $I_{ges}$. This operational state occurs, for example, at a low rotation speed and a small torque of the asynchronous machine 5.

2. $I_N > 0$ $I_G > 0$

Both machine converters 4, 6 supply a current; the normal thyristor machine converter 6 operates in inverter end position, as illustrated by the inverter phase angle $\gamma_N$.

The current can be distributed according to the following criteria:
  a) The current $I_N$ of the normal thyristor machine converter 6 depends on the rotation speed n, for example
     $I_N = 0$ for $n \leq n_0$
     $I_N = A (n - n_0)$ for $n \geq n_0$
     A = 0 proportionality factor
     $n_0$ = minimum rotation speed for normal thyristor machine converter operation.
  b) Optimization for efficient operation of both machine converters.
3. The phase shift between the currents $I_G$ and $I_N$ of the two machine converters 4, 6 is $\phi = 90°$. The normal thyristor machine converter 6 operates in inverter end position, the current $I_G$ of the GTO thyristor machine converter 4 goes through a minimum.
4. Technically unsound current distribution.

The normal thyristor machine converter 6 operates with an inverter phase angle which is larger than the required inverter phase angle $\gamma_N$. The machine converter 6 then generates a larger reactance power than required. This reactance power has to be compensated by the GTO thyristor machine converter 4. In addition, the normal thyristor machine converter 6 produces more active or real current than required. The GTO thyristor machine converter 4 therefore operates as a rectifier and feeds the excess real power back to its respective current link.

Several advantageous features are realized by connecting the normal thyristor machine converter 6 and the GTO thyristor machine converter 4 in parallel.

The normal thyristor machine converter 6 operates only with 120° blocking and consequently generates current harmonics only at 5 times, 7 times, 11 times, etc. of the fundamental frequency. To prevent resonant oscillations, the normal thyristor machine converter 6 must be started only if the frequency of the fifth harmonic lies significantly, i.e., approximately by a factor 1.5, above the resonant frequency defined by the capacitors $C_R$, $C_S$, $C_T$ and the stray inductance of the asynchronous machine 5.

Conversely, in multiple pulsed operation the GTO thyristor machine converter 4 can be controlled in such a way that interfering harmonic frequencies do not occur. Moreover, the parallel operation takes into account that the GTO thyristor machine converter 4 cannot support as large a load as the normal thyristor machine converter 6, so that the GTO thyristor machine converter 4 is more advantageously used at low rotation speeds and at a small torque, as is illustrated in FIG. 4.

In FIG. 6, there are illustrated oscillograms of the current and voltage curves of the circuitry of the invention which is depicted in FIG. 3. The functional dependence $i_G = f(t)$ demonstrates that the GTO thyristor machine converter is pulsed at three times the fundamental frequency. It is also illustrated in FIG. 6(b) that a positive turn-off voltage has to be supplied to the GTO thyristor during several time intervals after being turned off, whereas the normal thyristor switches off only when a negative turn-off voltage as shown in FIG. 6(d) is applied. Consequently, both switching elements are employed according to their characteristic features.

Figure 8:
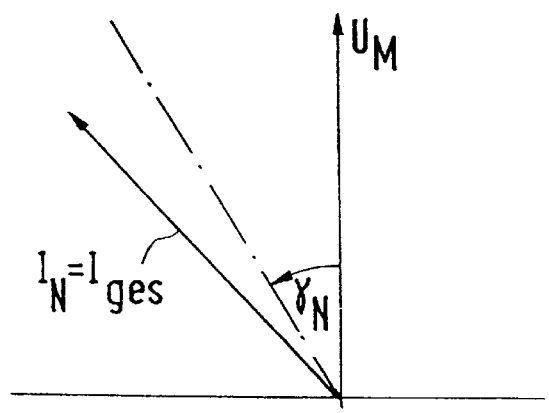
FIG. 8 shows a vector diagram of the total current of the converter in the operating range of the normal thyristor machine converter.

In the case where the phase of the total converter current $I_{ges}$ of FIG. 6(f) relative to the machine voltage $U_M$ of FIG. 6(h) is larger then the smallest allowed inverter phase angle $\gamma_N$, the GTO thyristor machine converter 4 is no longer required for supplying the asynchronous machine 5. The corresponding vector diagram is illustrated in FIG. 8. The GTO thyristor machine converter 4 can then be used to compensate the fifth harmonics of the total converter current $I_{ges}$ which is generated by the normal thyristor machine converter 6. Here, the GTO thyristor machine converter 4 has to supply the current function $i_G = f(t)$ illustrated in FIG. 11.

Figure 9:
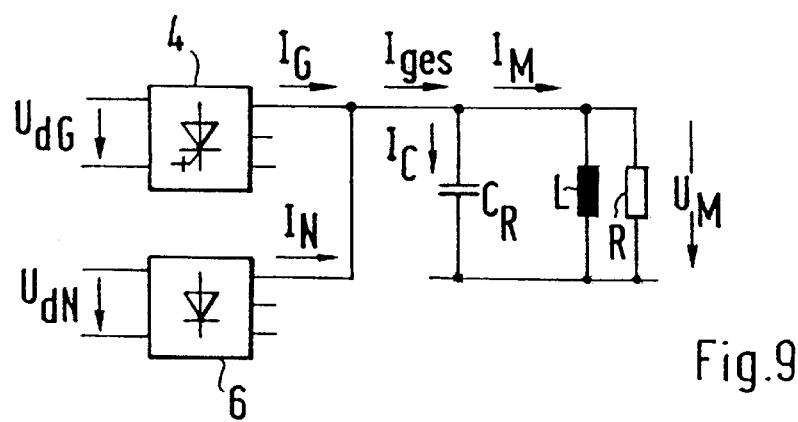
FIG. 9 shows a circuit diagram of machine converters of paralleled DC-linked AC converters feeding an R-L load.
Figure 10A:
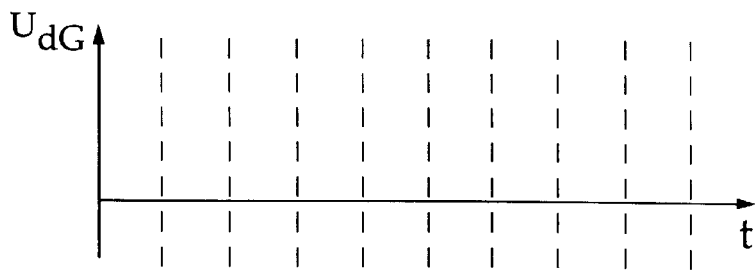
FIG. 10 shows a diagram of the currents and voltages of FIG. 9 as a function of time when the GTO thyristor machine converter is inhibited, including.
Figure 10B:
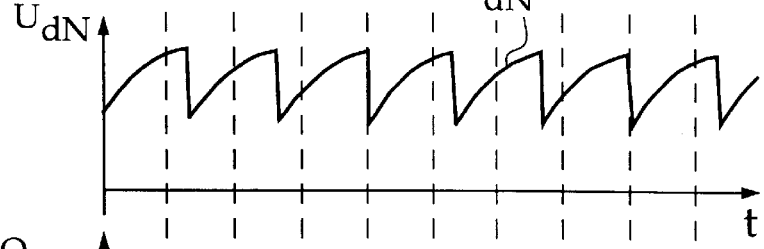
Figure 10C:
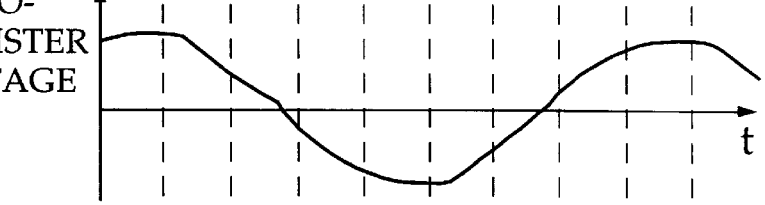
Figure 10D:
Figure 10E:
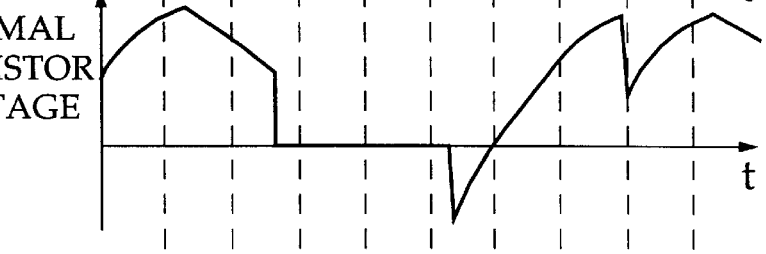
Figure 10F:
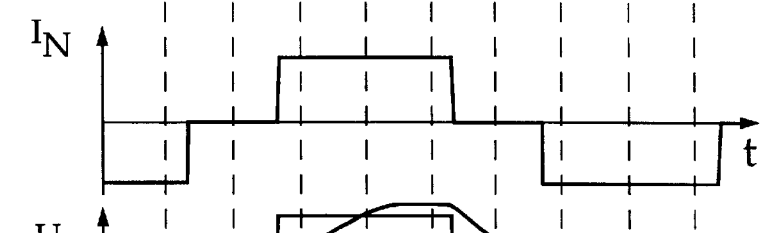
Figure 10G:
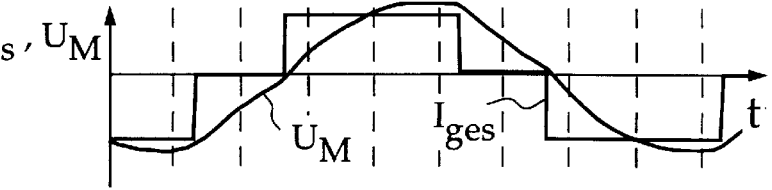
Figure 11A:
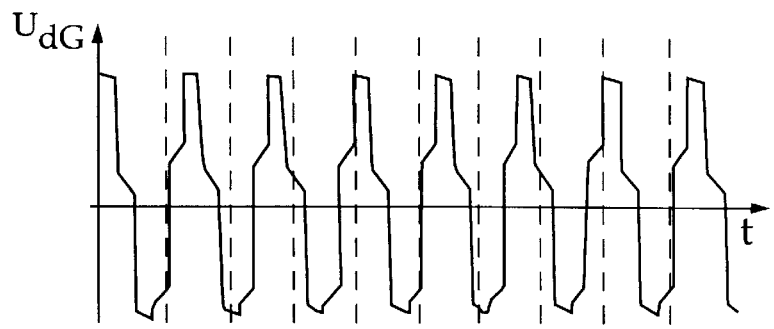
FIG. 11 shows a diagram of the currents and voltages of FIG. 9 as a function of time when the GTO thyristor machine converter is used to compensate for harmonics, including.
Figure 11B:
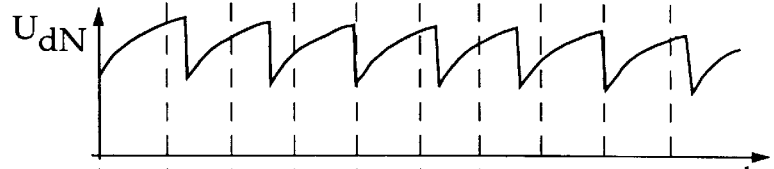
Figure 11C:
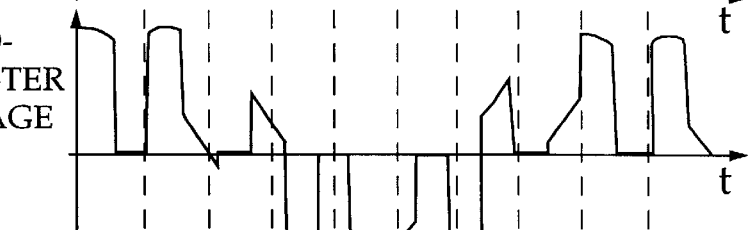
Figure 11D:
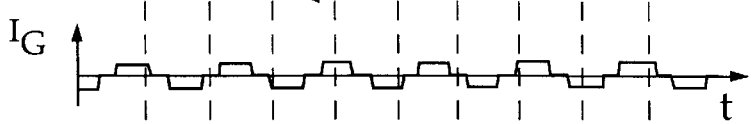
Figure 11E:
Figure 11F:
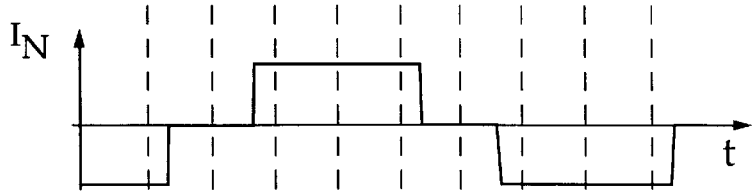
Figure 11G:
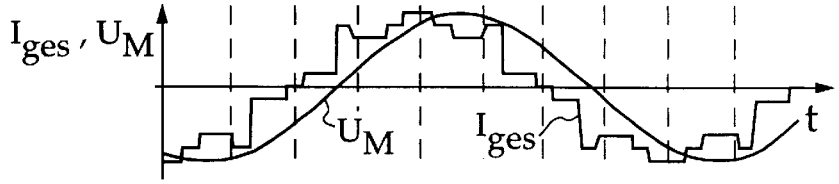

If the parallel-connected DC-linked AC converters feed an R-L load, as illustrated in FIG. 9 (with line converters omitted for clarity), then the currents and voltages of FIG. 9 produce the time dependent functions depicted in FIGS. 10 and 11.

FIG. 10 illustrates the time dependence for the situation where the GTO thyristor machine converter 4 is inhibited. In FIG. 10(g), there are shown the square wave current blocks $i_{ges} = f(t)$ of the total converter current as a function of time.

FIG. 11 illustrates the time dependence for the situation where the GTO thyristor machine converter 4 is used to compensate for harmonics. The effect of the compensation is clearly evident from the time dependence of the function $i_{ges} = f(t)$ of the total converter current illustrated in FIG. 11(g). The time dependence approaches that of a sine wave function.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Apparatus comprising DC-linked AC converters connected in parallel for feeding an asynchronous machine (5) using the principle of field-oriented control,
    characterized in that a first DC-linked AC converter including a machine converter comprising controlled turn-on devices without any controlled turnoff devices and a second DC-linked AC converter including a machine converter comprising controlled turn-on and turnoff devices are connected in parallel to the asynchronous machine,
    that the DC-linked AC converter including the machine converter comprising controlled turn-on and turnoff devices is controllable so as to supply reactive power for the asynchronous machine (5) and commutation reactive power for the DC-linked AC converter including the machine converter comprising controlled turn-on devices minus reactive power of commutation capacitors ($C_R$, $C_S$, $C_T$) connected to the asynchronous machine.

2. The apparatus of claim 1, characterized in that at a low rotation speed of the asynchronous machine (5) and at a small required torque, the second DC-linked AC converter having the machine converter comprising controlled turn-on and turnoff devices is controlled so that a total current ($I_{ges}$) of the DC-linked AC converters connected in parallel includes a capacitive component.

3. The apparatus of claim 1, characterized in that under operating conditions where a total current ($I_{ges}$) is supplied only by the first DC-linked AC converter having the machine converter comprising controlled turn-on devices, the second DC-linked AC converter having the machine converter comprising controlled turn-on and turnoff devices is used to compensate for harmonics generated by the first DC-linked AC converter.

4. Circuitry with a first DC-linked AC converter (1) in parallel with a second DC-linked AC converter (2), each DC-linked AC converter (1, 2) comprising a line converter (1.1, 2.1), a current link with a DC smoothing choke (1.3, 2.3) and a machine converter (1.2, 2.2), characterized in that AC outputs of a first machine converter (1.2) of said first DC-linked AC converter having controlled turn-on devices without any controlled turnoff devices are connected to AC outputs of a second machine converter (2.2) of said second DC-linked AC converter having controlled turn-on and turnoff devices as well as to the terminals of an asynchronous machine (5).

* * * * *